United States Patent [19]
Kaneko et al.

[11] 4,029,339
[45] June 14, 1977

[54] SAFETY BELT DEVICES FOR VEHICLES

[75] Inventors: Yuichiro Kaneko; Fuminori Teraoka, both of Aichi; Tatsushi Kubota, Kisogawa; Takehiko Nishikawa, Aichi, all of Japan

[73] Assignee: Kabushiki Kaisha Tokai Rika Denki Seisakusho, Japan

[22] Filed: Oct. 30, 1975

[21] Appl. No.: 627,379

Related U.S. Application Data
[62] Division of Ser. No. 301,796, Oct. 30, 1972, Pat. No. 3,933,369.

[30] Foreign Application Priority Data
Nov. 4, 1971 Japan .............................. 46-87868

[52] U.S. Cl. ............................................. 280/745
[51] Int. Cl.² ....................................... B60R 21/02
[58] Field of Search ........... 280/745, 747; 297/388, 297/389

[56] References Cited
UNITED STATES PATENTS

| | | | |
|---|---|---|---|
| 3,583,764 | 6/1969 | Lohr | 280/747 |
| 3,679,229 | 7/1972 | Weststrate | 280/745 |
| 3,680,833 | 8/1972 | Keppel et al. | 280/745 |
| 3,770,078 | 11/1973 | Keppel et al. | 280/745 |
| 3,815,934 | 6/1974 | Weststrate | 280/745 |
| 3,915,472 | 10/1975 | Lindblad | 280/745 |

Primary Examiner—Robert R. Song
Attorney, Agent, or Firm—Stevens, Davis, Miller & Mosher

[57] ABSTRACT

A safety belt device for use in vehicles, having at least one belt extending across the body of a passenger sitting on a seat, in which the belt is held in a disengaging position forwardly of the seat irrespective of the door opening and closing operation when the passenger is not sitting on the seat, providing for the passenger to get into the vehicle, and is placed in an engaging position when the passenger has sat down on the seat and closed the door, restraining the body of the passenger, and is retracted to the disengaging position when the passenger sitting on the seat has opened the door providing for alighting of the passenger from the vehicle.

5 Claims, 11 Drawing Figures

SAFETY BELT DEVICES FOR VEHICLES

This is a Division of application Ser. No. 301,796 filed Oct. 30, 1972, now U.S. Pat. No. 3,933,369.

This invention relates to a safety belt device for use in vehicles.

An object of the present invention is to provide a safety belt device which is so designed that a belt is automatically released and tightly engaged around the body of a passenger when the passenger has sat down on a seat and closed the adjacent door of the vehicle.

Another object of the invention is to provide a safety belt device of the character described, in which the belt is held in a disengaging position forwardly of the seat when the passenger is not sitting on the seat, so as not to interfere with the passenger sitting on the seat.

Still another object of the invention is to provide a safety belt device of the character described, in which the belt is automatically retracted to the disengaging position when the passenger has opened the door to get out of the vehicle, releasing the passenger from restraint and allowing the passenger to get off the vehicle.

The safety belt device according to the present invention has at least one belt extending across the body of a passenger sitting on a seat, with one end thereof anchored to a retractor provided on the inner surface of a door at a location opposite to the outer side of the seat and the other end anchored to the inner side of the seat or to the body of the vehicle adjacent the inner side of the seat, or alternatively with one end thereof anchored to the inner side of the door and the other end anchored to a retractor provided on the inner side of the seat or on the body of the vehicle adjacent the inner side of the seat, in a way to restrain the waist portion of the passenger when the door is closed, and a drawing belt or wire provided at the forward portion of the inner side of the door, with one end thereof connected to said belt and the other end anchored to winding means driven by a motor in timed relation to the door opening operation or an operation preparatory for opening the door, for withdrawing the belt from said retractor and placing the same in the disengaging position incident to the door opening operation.

The present invention will be described in further detail hereunder with reference to the accompanying drawings.

FIGS. 5 to 7 are views showing still another embodiment of the safety belt device of the invention, of which

FIGS. 9 to 11 show a further embodiment of the safety belt device of the invention, of which

Figure 1:
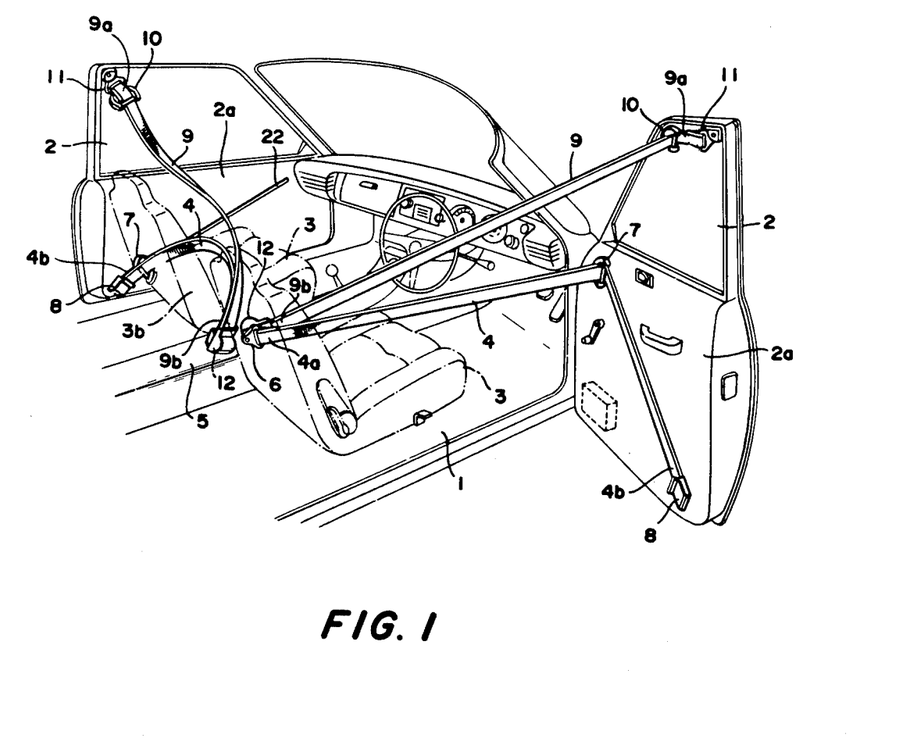
FIG. 1 is a fragmentary perspective view of a vehicle equipped with the safety belt device of the invention; a door adjacent the driver's seat being left opened after alighting of the driver and a door adjacent the assistant driver's seat beind held closed after a passenger has set down on the seat.

The first embodiment of the invention will be described with reference to FIGS. 1–3. In FIG. 1, reference numeral 1 designates the body of an automobile, 2 doors and 3 seats. A waist belt 4 has one end 4a anchored to an anchor plate 6 fixed to the central portion 5 of the automobile body, with the other end 4b thereof extending through a guide ring 7 and anchored to a retractor 8 provided at the lower portion of the door 2. The retractor 8 is of a known type which is so constructed as to lock the belt automatically against withdrawal therefrom when the automobile undergoes a positive or negative acceleration as in the case of a head-on collision or rear-end collision. A shoulder belt 9 is extending obliquely across the chest portion of a passenger, with one end 9a anchored to an anchor plate 11 fixed to the upper portion of the door 2 after passing through a guide ring 10, with the other end 9b thereof anchored to a retractor 12 fixed to the central portion 5 of the automobile body.

Figure 2:
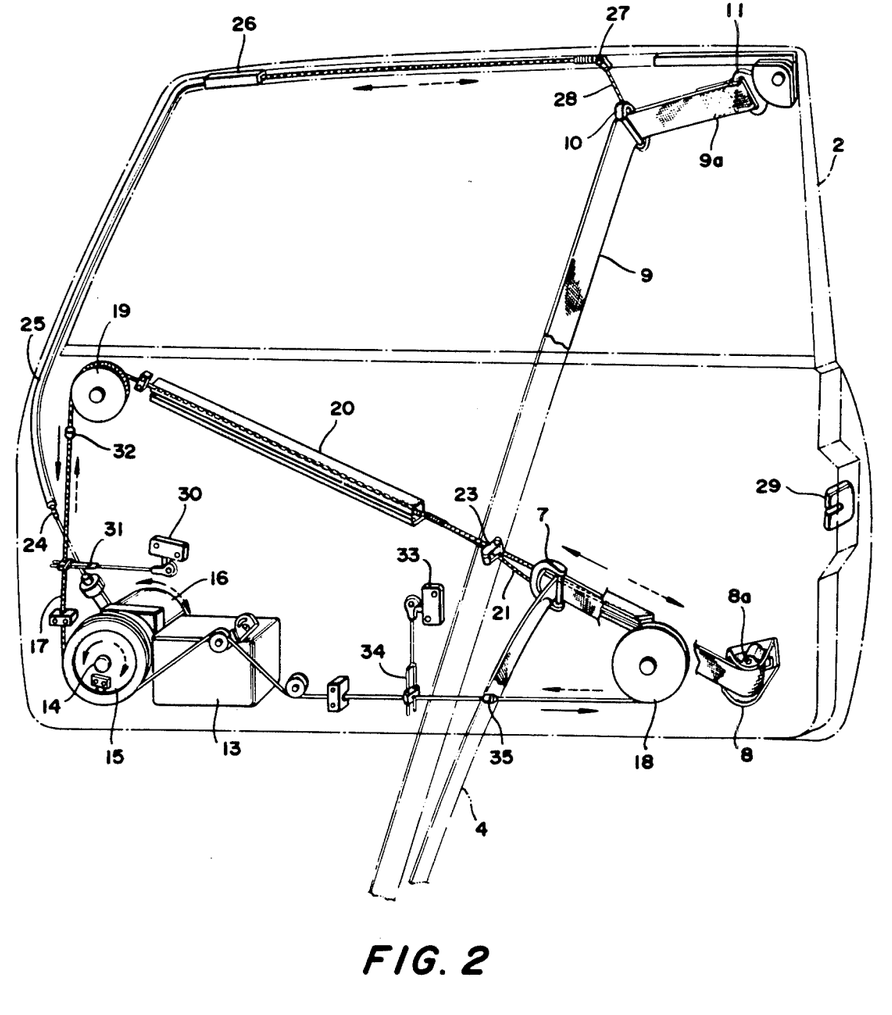
FIG. 2 is a front view of a guide ring shifting mechanism provided on the inner side of the door.

FIG. 2 shows a mechanism for shifting the waist belt guide ring 7 and the shoulder belt guide ring 10, which is arranged in the inside of the door 2 upon removing an inner lining 2a of said door. As shown, a drive shaft 14 of a motor 13 which is rotatable in one or the other direction, has a pulley drum 15 mounted on one end and a cup ring 16 mounted on the other end thereof. A wire 17 is engaged around the pulley drum 15 and two other pulley drums 18, 19. The pulley drum 18 is located adjacent the retractor 8 and the pulley drum 19 is located in a position slanting upwardly of said retractor 8. A substantially C-shaped guide rail 20 is provided between the pulley drums 18 and 19 along the wire 17, extending slantingly upwardly from the inner lower portion of the door, and the waist belt guide ring 7 having the waist belt 4 loosely passing therethrough is connected by means of a string 21 to a suitable location of the wire 17 extending in said guide rail 20. A slit 22 is formed in the inner lining 2a of the door 2 along the guide rail 20 (see FIG. 1). In order to prevent an oscillatory movement of the waist belt guide ring 7, the string 21 is passed through an oscillation preventive ring 23 which is loosely received in the guide rail 20 and fixed to the wire 17 adjacent the waist belt guide ring 7. A plastic wire 24 having one end anchored to the coupling ring 16 to be wound therearound is passed in an outer tube 25 embedded in a door framework and also in a guide rail 26 provided at the upper end portion of the door framework, and connected at the other end to the shoulder belt guide ring 10 having the shoulder belt 9 loosely passing therethrough, through a roller 27 and a string 28. Reference numeral 29 designates a door switch incorporated in a door lock for controlling the direction of rotation of the motor 13, and 30 designates a stop switch for controlling the motor 13. An actuator 31 is provided in engagement with the stop switch 30, which is formed therein with an opening which is larger in diameter than the wire 17 to provide for free movement of the wire therein. A stopper 32 is fixed to a suitable location of the length of the wire 17 between the pulley drum 19 and the actuator 31, which will be carried by the wire into abutment against the actuator 31 when said wire is shifted to a position to completely raise the waist belt 4 and shoulder belt 9, thereby to actuate the stop switch 30. Reference numeral 33 designates another stop switch similar to the stop switch 30, which will be actuated by an actuator 34 in contact therewith. A stopper 35 is fixed to a suitable location of the length of the wire 17 between the pulley drum 18 and the actuator 34. This stopper 35 will be carried by the wire into abutment against the actuator 34 when said wire is shifted to a position to completely lower the belts 4 and 9, thereby to actuate the stop switch 33. In FIG. 2, the solid line arrows indicate a belt raising direction and the dotted line arrows indicate a belt lowering direction.

Figure 3:
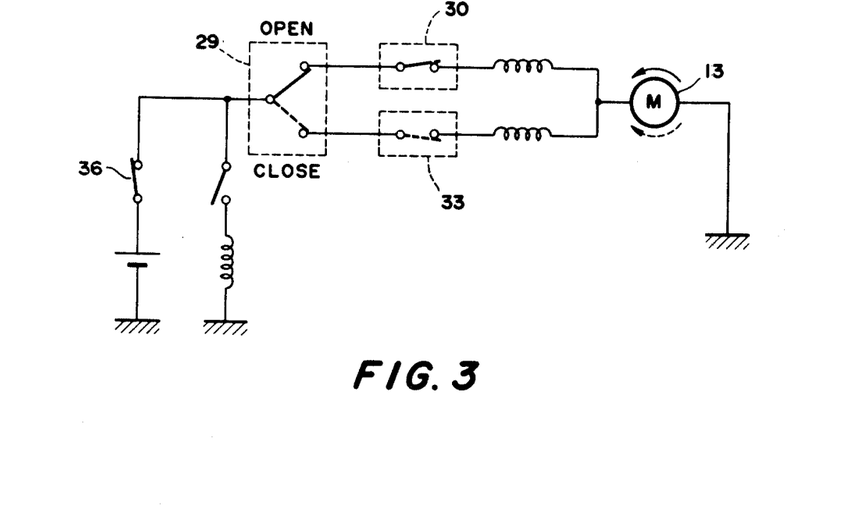
FIG. 3 is a wiring circuit diagram of the safety belt device.

Referring to FIG. 3, there is shown an electric circuit of the safety belt device, including the door switch 29, the stop switches 30, 33, the motor 13 and a seat switch 36 which is provided below the seat 3 and will be actuated to close a motor driving circuit when a passenger sits down on the seat.

The safety belt device of the construction described above will operate in the following manner: Namely, when the door 2 is open, the guide rings 7 and 10 for the waist belt 4 and shoulder belt 9 are located adjacent the door hinge and, therefore, said belts will not interfere with the passenger getting into the automobile. When the passenger is in the automobile and has sat down on the seat, the seat switch 36 is switched on but the guide rings 7, 10 are still immovably held in their positions respectively. Now, when the door 2 is closed in this state, the door switch 29 is switched on and the motor 13 is driven in reverse direction as indicated by the dotted line arrow. The guide ring 7 connected to the wire engaged around the pulley drums 15, 18, 19 moves along the guide rail 20 by being carried by said wire, toward the lower portion of the door 2. At the same time, the plastic wire 24 wound on the cup ring 16, mounted on the drive shaft 14 of the motor 13, is forcibly paid out therefrom, so that the guide ring 10 is carried by said wire and the shoulder belt 9 is raised by said guide ring 10. When the stopper 35 fixed to the wire 17 is brought into abutment against the actuator 34, the stop switch 33 is switched off and thus the motor 13 is stopped. The excess portions of the belts 4, 9 are taken up by the respective retractors 8, 12. Thus, the body of the passenger is restrained by the waist belt 4 and the shoulder belt 9. Now, the operation of the device in the event when the passenger gets out of the automobile will be described. When the passenger pulls a handle inside the door, 2, the door switch 29 is actuated, with the result that the motor 13 rotates in the normal direction as indicated by the solid line arrow and the guide rings 7, 10 are shifted to their original positions, so that the belts 4, 9 release the passenger from restraint. Thus, the passenger can get out of the automobile without interferance from the belts 4, 9. When the stopper 32 fixed to the wire 17 is brought into abutment against the actuator 31, the stop switch 30 is turned off to stop the motor 13. Now, when the passenger closes the door after getting out of the automobile, the door switch 29 is actuated but the seat switch 36 is in its off-position, so that the belts 4, 9 are immovably held in their disengaging positions.

Figure 4:
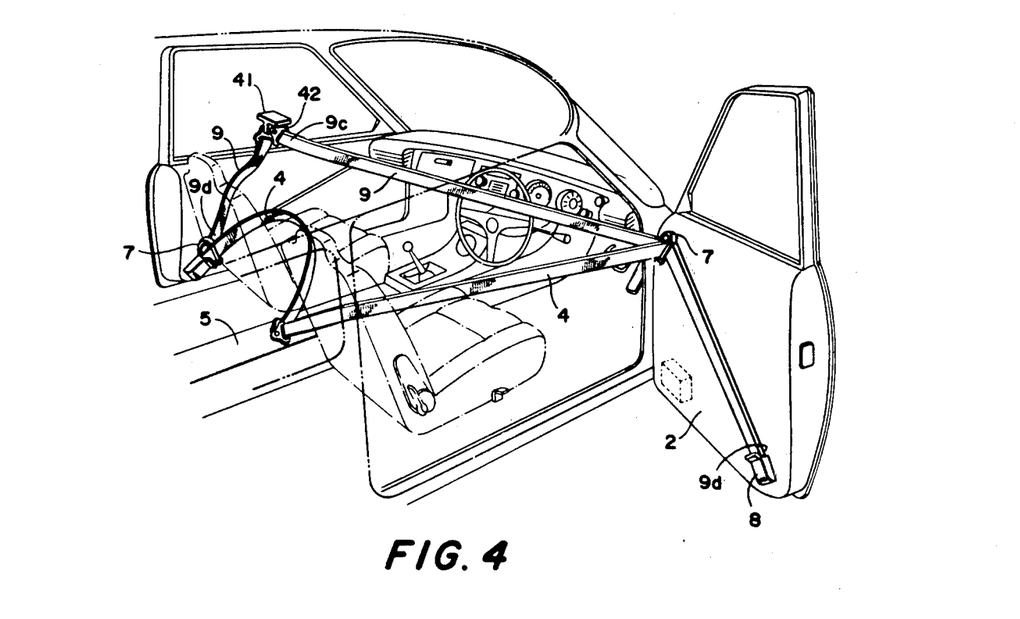
FIG. 4 is a fragmentary perspective view of a vehicle equipped with another embodiment of the safety belt device of the invention.

FIG. 4 shows another embodiment of the safety belt device according to the invention. In this embodiment, the waist belt 4 is connected in the same manner as in the preceding embodiment shown in FIG. 1 but the shoulder belt 9 has one end 9c anchored to an anchor plate 42 which is fixed to an anchor element 41 provided centrally of the automobile roof, with the other end 9d connected to the retractor 8 for the waist belt 4, after passing the waist belt guide ring 7. Namely, the waist belt 4 and shoulder belt 9 are loosely passed through the waist belt guide ring 7 and connected to the retractor 8 to be taken up thereby. Therefore, according to this embodiment, the cup ring 16, the plastic wire 24, the outer tube 25, the guide rail 26, the roller 27, the string 28, the shoulder belt guide ring 10 and the anchor plate 11, shown in FIG. 2 become unnecessary. In the operation of this embodiment, the raising and lowering of the waist belt 4 and shoulder belt 9 are effected by the waist belt guide ring 7 which is shifted as described in the preceding embodiment.

It is to be understood that, in the first and second embodiments described above, the shoulder belt 9 and the means for operating the same may be removed when it is desired to use only the waist belt 4.

Figure 5:
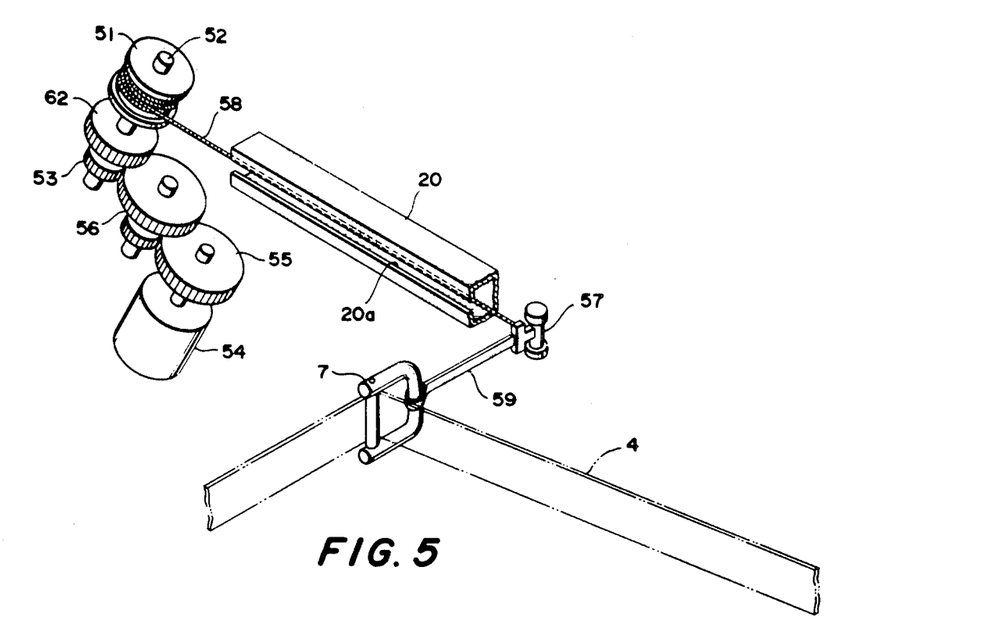
FIG. 5 is a perspective view of the essential portion of the device.
Figure 6:
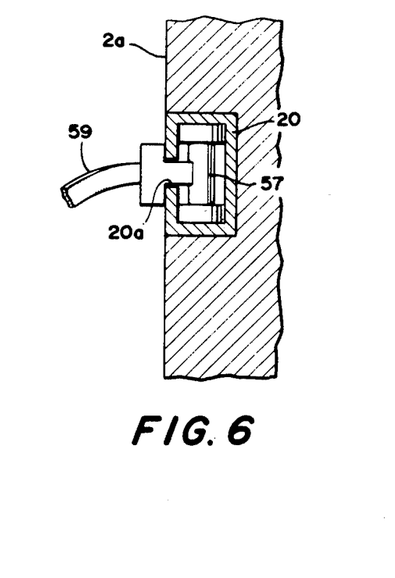
FIG. 6 is a sectional side view of the mechanism shown in FIG. 5.
Figure 7:
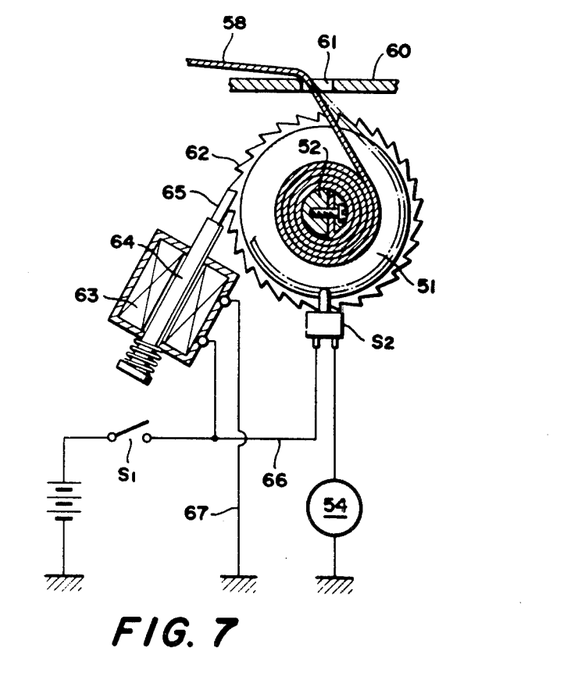
FIG. 7 is a plan view of the mechanism shown in FIG. 5.

The third embodiment of the invention will be described with reference to FIGS. 5–7. This embodiment is a modification of the first embodiment shown in FIG. 2, in which the waist belt 4 only is used which is operated by a different form of belt driving mechanism. According to this embodiment, a winding reel 51 is disposed at the position of the pulley drum 19 in FIG. 2, and a gear 53 is fixedly mounted on a shaft 52 of said reel 51, substantially parallel to the shaft 8a of the retractor 8 (see FIG. 2), and further a reduction gearing 56 is interposed between the gear 53 and a drive gear 55 of a motor 54, to constitute a driving mechanism. All of the motor 54, the reduction gearing 56 and the winding reel 51 are disposed inside the inner lining 2a of the motor 2.

A guide rail 20 of substantially C-shaped cross-section is provided between the winding reel 51 and the shaft of the retractor 8 along a wire 58, extending slantingly upwardly from the inner lower portion of the door. The guide rail 20 has a longitudinal slot 20a which is located in the same plane as the inner surface 2a of the door. Loosely received in the hollow space of the guide rail 20 is a sliding member 57 which is fixed at its one side to the end of the wire 58 and at the other side to the belt guide ring 7 by means of a flexible connecting piece 59 projecting outwards from the longitudinal slot 20a of the guide rail; thereby the oscillation preventive member 57 is movable longitudinally in the guide rail 20 accompanying the guide ring 7. A driving circuit 66 for the motor 54 is arranged such that the motor is set in motion by a door switch $S_1$ which will be closed when the door 2 is slightly opened, and is stopped by a switch $S_2$ which will be opened when the diameter of a winding of a wire 58 on the winding reel 51 increases and reaches a predetermined value. A ratchet wheel 62 is fixedly mounted on the shaft 52 of the winding reel 51, while a ratchet pawl 65 for preventing reverse rotation of said shaft 52 by engagement with said ratchet wheel 62 is formed on a plunger 64 operated by a solenoid 63. The aforesaid door switch $S_1$ is incorporated in an exciting circuit 67 for the solenoid 63, as shown in FIG. 7.

This embodiment operates in the following manner: Namely, when the passenger sitting on the seat 3 closes the door 2, the door switch $S_1$ and hence the exciting circuit 67 for the solenoid 63 are opened, with the result that the shaft 52 of the winding pulley 51 is released from restraint against reverse rotation by the ratchet pawl 65, and thus the belt 4 is retracted automatically by the winding shaft 8a of the retractor 8 while unwinding the wire 58 from the winding reel 51. Therefore, the belt 4 is stretched taut, extending from the anchor plate 6 around the belly portion of the passenger and thus restraining the body of the passenger in cooperation with the seat 3. Namely, the belt 4 is placed in its engaging position (see the left side seat 3 and the belt 4 in FIG. 1).

With the belt 4 being in its engaging position, when the door 4 is slightly opened, the door switch $S_1$ is opened and the switch $S_2$ is also opened which has previously been closed as a result of unwinding of the wire 58, so that the driving circuit 66 is closed and the exciting circuit 67 is also closed. As a result, the motor 54 is set in motion and concurrently the solenoid 63 is excited, and the winding reel 51 driven at a slow speed by the motor 54 winds up the wire 58 while withdrawing the belt 4 from the winding shaft 8a of the retractor 8 through said wire against the biasing force of a spring acting on said winding shaft 8a. At the same time, the ratchet pawl 65 engages the ratchet wheel 62 to prevent reverse rotation of the shaft 52. Thus, the belt 4 is drawn upwardly by the guide ring 7 and cleared from the body of the passenger. Namely, the belt 4 is placed in its disengaging position. The switch $S_2$ is opened at the same time when the diameter of the winding of wire 58 on the winding reel 51 has increased and reached the predetermined value, so that the driving circuit 66 is opened and the motor 54 stops its rotation. The belt 4 is held in its disengaged position because the shaft 52 is held against reverse rotation by the ratchet pawl 65. When the door 2 is further opened to its full open position like the right side door shown in FIG. 1, the retractor 8 is also moved away from the way of the passenger, so that the passenger can get out of the automobile without interference from, the belt 4.

Figure 8:
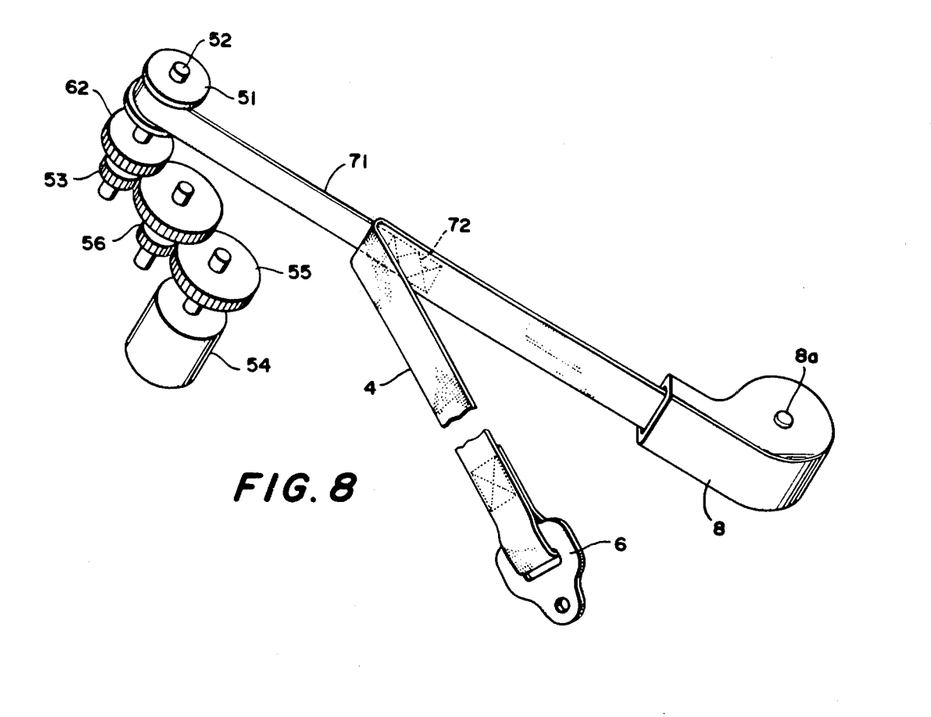
FIG. 8 is a perspective view of a still another embodiment of the safety belt device of the invention, showing a drawing belt operating mechanism.

Next, the fourth embodiment of the invention will be described with reference to FIG. 8. This embodiment is a modification of the third embodiment, in which a drawing belt 71 is used in lieu of the guide rail 20, the oscillation preventive ring 57, the wire 58, the flexible connecting member 59 and the waist belt guide ring 7, shown in FIG. 5. One end of the drawing belt 71 is fixedly connected to the most suitable location of the belt 4 by sewing and the other end thereof is secured to the winding reel 51.

It should be understood that, in the first to fourth embodiments described above, the mounting positions of the retractor 8 and the anchor plate 6 may be changed with respect to each other.

Figure 9:
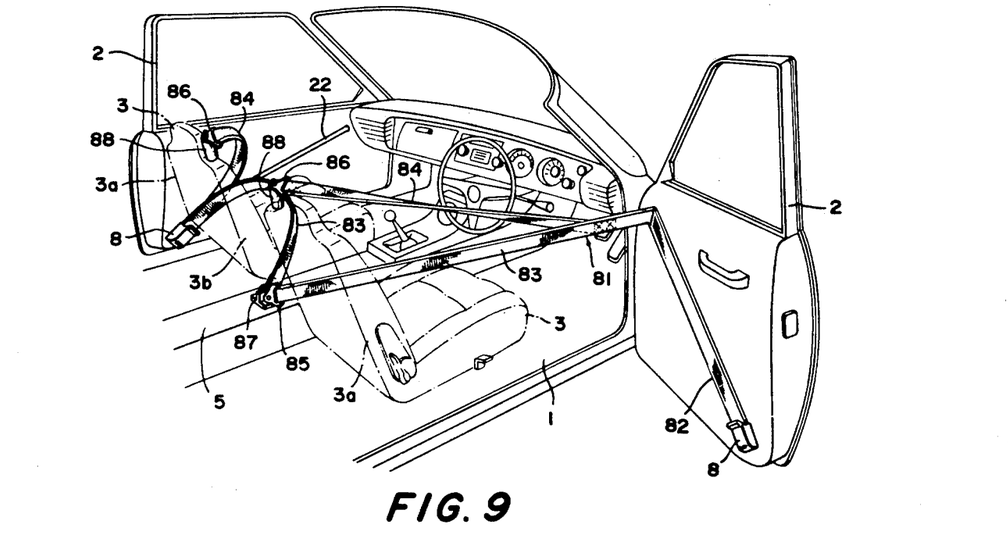
FIG. 9 is a perspective view of the essential portion.
Figure 10:
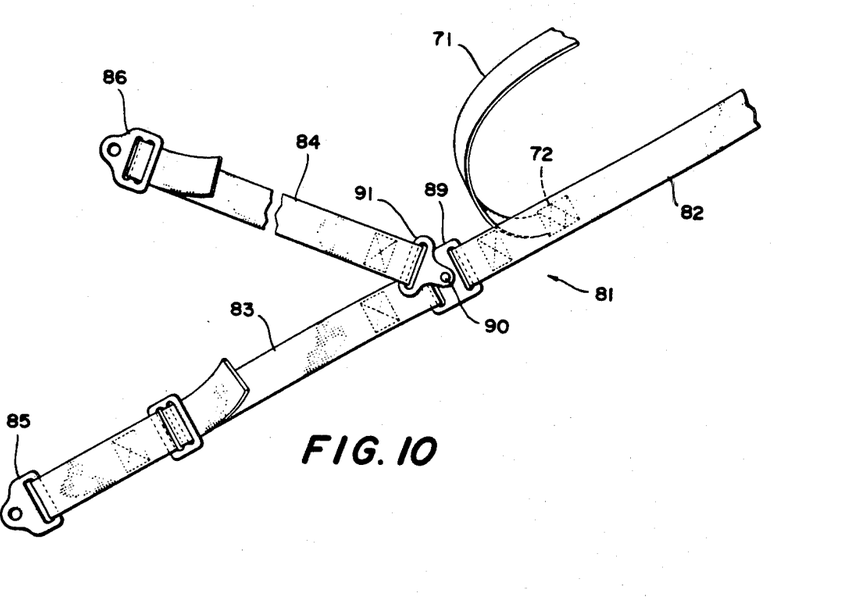
FIG. 10 is a perspective view of the three-point belt.
Figure 11:
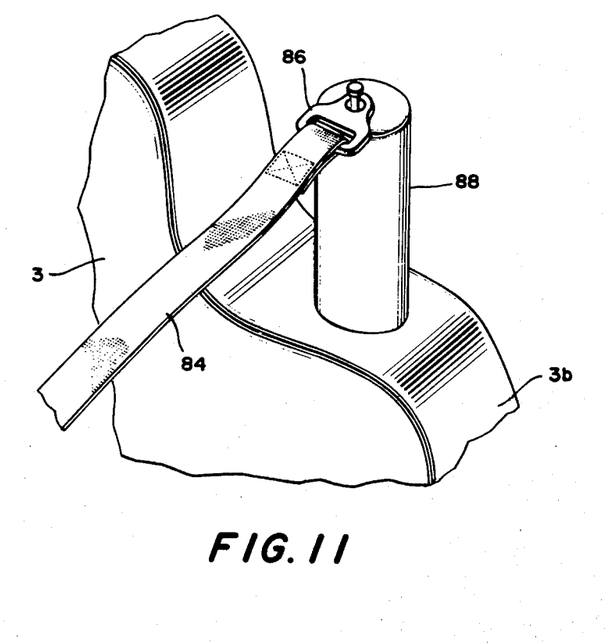
FIG. 11 is an illustrative view showing the connection between a short pole and an anchor.

FIGS. 9–11 show the fifth embodiment of the invention. This embodiment comprises a shoulder belt added to the third and fourth embodiments. Namely, a belt 81 consists of a three point belt composed of a waist belt 83 and a shoulder belt 84, which are branched from a common belt 82. The common belt 82 extends slantingly from the retractor 8 to the upper portion of the door 2 along the slit 22 provided on the inner surface of the door 2. A drawing belt is shown in FIG. 8 is provided in the inner surface of the door along the slit 22, which belt has one end rigidly connected to the common belt by sewing as at 72 and the other end secured to a suitable winding reel. The free end of the common belt 82 is secured to the winding shaft 8a of the retractor 8 provided on the inner side of the associated door 2. The free end of the waist belt 83 is provided with an anchor 85 and connected to a hook 87, fixed to the central portion 5 of the automobile body, by way of said anchor 85, while the free end of the shoulder belt 84 is provided with an anchor 86 and connected to an upright short pole 88, fixed to the inner portion of the backside of the seat 3 (see FIG. 11), by way of said anchor 86. The construction of the three point belt is variable widely but an example thereof is shown in FIG. 10. In this example, the common belt 82 and the waist belt 83 are connected with each other by means of a coupler 89, and the shoulder belt 84 is connected to said coupler 89 through a coupler 91 which is pivotably connected to said coupler 89 by means of a pin 90. The anchors 85, 86 are of a type which provides for free adjustment of the lengths of the waist belt 83 and shoulder belt 84.

The other construction of this embodiment is the same as that of the fourth embodiment. Namely, a drawing belt 71 is fixed to the common belt 82 by sewing as at 72 and a mechanism for winding said drawing belt on the winding reel 51 (though not apparent in FIGS. 9–11) concurrently with opening of the door 2 is the same as that of the third and fourth embodiments shown in FIGS. 6 and 7.

The function of the common belt 82 and waist belt 83 of the three point belt 81 are the same as that of the belt 6 in the third and fourth embodiments. Namely, when the door 2 is closed, the common belt 82 is concurrently retracted into the retractor 8 and the waist belt 83 is placed in its engaging position extending around the belly and waist portion of the passenger, whereas when the door 2 is opened, the common belt 82 is withdrawn from the retractor 8 by the drawing belt 71 and the waist belt 83 is cleared from the seat and simultaneously the retractor 8 is moved away with the door from the way of the passenger. The shoulder belt 84 connected to the common belt 82 is placed in its engaging position around the shoulder of the passenger, at the same time when the waist belt 83 is placed in its engaging position (see the left side shoulder belt in FIG. 9), and is placed in its disengaging position at the same time when the waist belt is placed in its disengaging position (see the right side shoulder belt in FIG. 9).

It should be understood that, in the first to fifth embodiments, while the waist belt 4, 83 is connected to the central portion 5 of the automobile body, it may alternatively be connected to the inside porition 3b of the seat 3.

As may be understood from the foregoing description, the safety belt devices of the invention are so constructed and operative that the belt is automatically placed in the engaging position to restrain the body of the passenger, by the door opening and closing operation and, therefore, with the safety belt device of the invention, the inadvertent failure in tightening the belt or the cumbersomeness of a belt tightening operation can be eliminated. Further, the safety belt device of the invention is so designed that the belt is shifted by the door opening and closing operation, only when the seat switch is in its closed position, so that an unnecessary movement of the belt can be avoided, and the belt is cleared forwardly from the seat when the passenger gets into or out of the automobile, so that is does not interfere with the passenger getting into or out of the automobile at all.

What is claimed is:
1. A safety belt device for vehicles, comprising:
   a safety belt retractor secured on the inner surface of a door of a vehicle at a location opposite the outer side of a seat adjacent said door, said inner surface of the door having a slit defined therein extending slantingly from the location in which said safety belt retractor is secured to the upper portion of said door;

a three point safety belt having a waist belt and a shoulder belt which are branched from a common belt connected at one end to said retractor and extending slantingly from said retractor from the lower to the upper portion of said door, the other end of said waist belt being secured to the central portion of a vehicle body and the other end of said shoulder belt being fixed to the inner portion of the backside of said seat;

a belt driving mechanism provided in the door and comprising a door switch operated by the door opening and closing operation, a motor set in motion upon actuation of said door switch, belt drawing means for drawing said common belt by the drive of said motor, said belt drawing means being in the door substantially along said slit and comprising a gear train connected to said motor and a drawing belt having one end fixedly connected to the common belt and the other end connected to the gear train, whereby when the door is closed, said waist and shoulder belts are retracted through said common belt into said retractor and placed in their engaging positions to restrain the waist portion and the shoulder portion, respectively, of a passenger sitting on said seat, and when the door is opened said motor is set in motion so that said common belt is withdrawn from said retractor through said belt drawing means to hold said waist and shoulder belts in their disengaging position.

2. A safety belt device for vehicles as defined in claim 1, in which the other end of said drawing belt is secured to a winding reel in association with said motor.

3. A safety belt device for vehicles as defined in claim 1, in which said waist belt is connected with said common belt by means of a first coupler, and said shoulder belt is connected to said first coupler through a second coupler which is pivotably connected to said first coupler by means of a pin.

4. A safety belt device for vehicles as defined in claim 1, in which the said other end of said shoulder belt is provided with an anchor and connected to said backside of said seat by way of said anchor.

5. A safety belt device for vehicles, comprising:

a safety belt retractor secured on the inner surface of a door of a vehicle at a location opposite the outer side of a seat adjacent said door, said inner surface of the door having a slit defined therein extending slantingly from the location in which said safety belt retractor is secured to the upper portion of said door;

a three point safety belt having a waist belt and a shoulder belt which are branched from a common belt connected at one end to said retractor and extending slantingly from said retractor from the lower to the upper portion of said door, said waist belt being connected at one end with said common belt by means of a first coupler and secured at the other end to the central portion of a vehicle body, and said shoulder belt being connected at one end with said first coupler through a second coupler which is pivotably connected to said first coupler by means of a pin and fixed at the other end to the inner portion of the backside of said seat by an anchor;

a belt driving mechanism provided in the door and comprising a door switch operated by the door opening and closing operation, a motor set in motion upon actuation of said door switch, belt drawing means including a drawing belt having one end fixed to the common belt of said three point safety belt and the other end secured to a winding reel in association with said motor, said belt drawing means being in the door substantially along said slit and comprising a gear train connected to said motor, whereby when the door is closed, said waist and shoulder belts are retracted into said retractor through said common belt running along said slit and placed in their engaging positions to restrain the waist portion and the shoulder portion, respectively, of a passenger sitting on said seat, and when the door is opened said motor is set in motion so that said common belt is withdrawn from said retractor through said belt drawing means along said slit to hold said waist and shoulder belts in their disengaging position.

* * * * *